Figure 1:
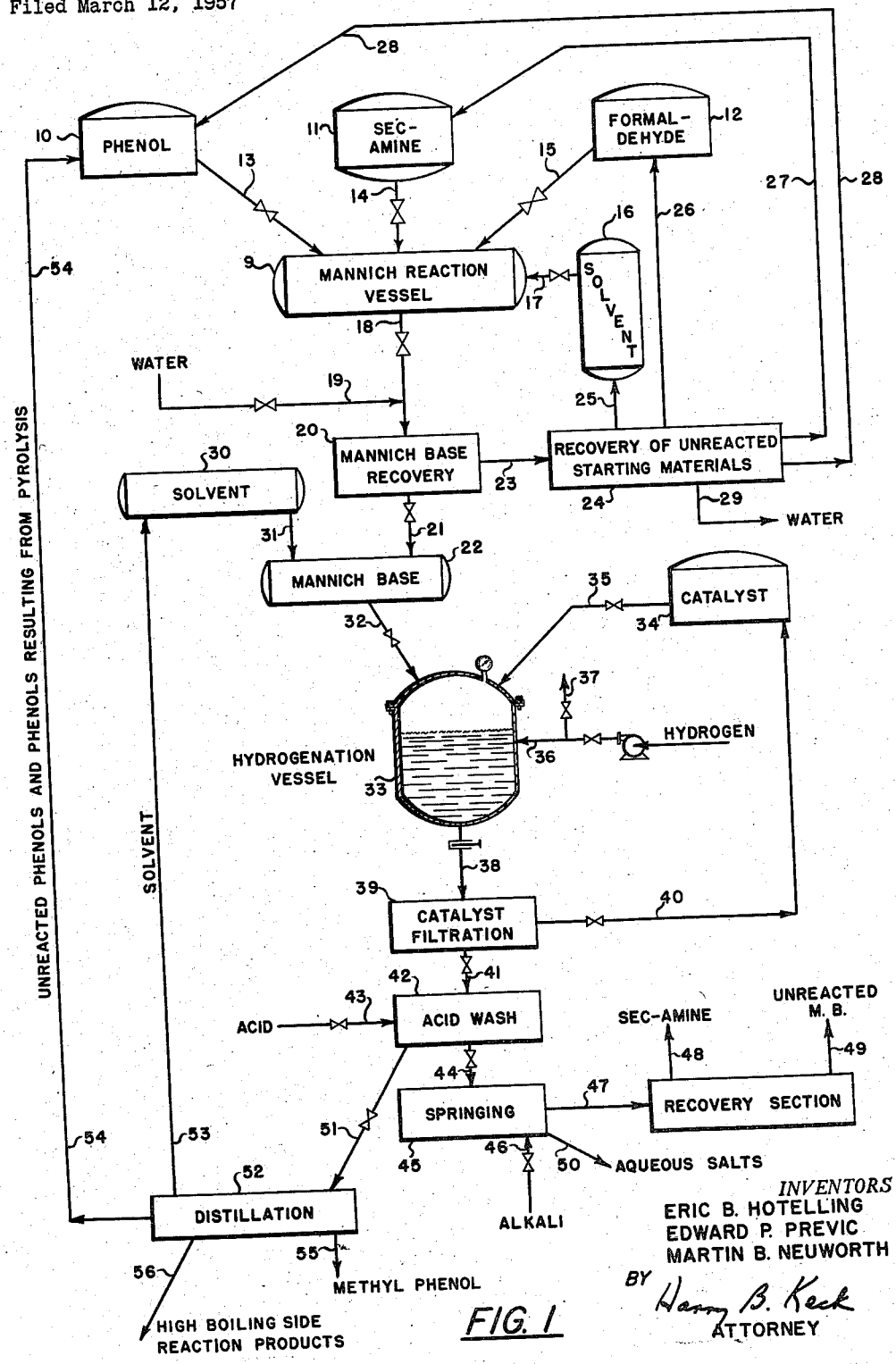

April 14, 1959   E. B. HOTELLING ET AL   2,882,319
REDUCING PHENOLIC MANNICH BASES WITH MOLYBDENUM SULFIDE CATALYSTS
Filed March 12, 1957   2 Sheets-Sheet 1

INVENTORS
ERIC B. HOTELLING
EDWARD P. PREVIC
MARTIN B. NEUWORTH
BY Harry B. Keck
ATTORNEY United States Patent Office 2,882,319
Patented Apr. 14, 1959

2,882,319

REDUCING PHENOLIC MANNICH BASES WITH MOLYBDENUM SULFIDE CATALYSTS

Eric B. Hotelling, Martin B. Neuworth, and Edward P. Previc, Pittsburgh, Pa., assignors to Consolidation Coal Company, Pittsburgh, Pa., a corporation of Pennsylvania Application March 12, 1957, Serial No. 645,450

15 Claims. (Cl. 260—583)

The present invention relates to an improved process for reducing phenolic Mannich bases with hydrogen by employing molybdenum sulfide as a hydrogenation catalyst.

A phenolic Mannich base can be produced by reacting a phenol, formaldehyde and a strongly basic secondary amine. The preparation of phenolic Mannich bases may be illustrated by the following typical reaction employing ortho-cresol as the phenol and dimethylamine as the strongly basic secondary amine.

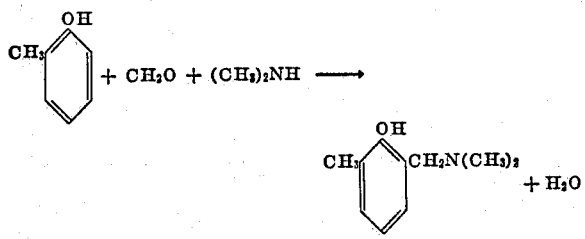

The phenolic Mannich base subsequently may be reduced with hydrogen in the presence of a catalyst at hydrogenation pressures and temperatures to restore the strongly basic secondary amine and a phenol which differs from the starting phenol by the addition of a methyl substituent at those ring positions where the Mannich reaction has occurred. Reduction of the phenolic Mannich base produced in the above illustration yields 2,6-xylenol and the starting dimethylamine.

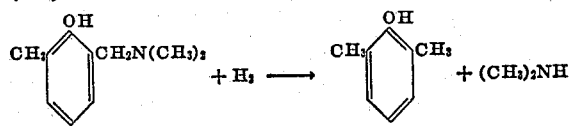

Hence the net result of the two above reactions is to produce 2,6-xylenol from ortho-cresol or, in broader scope, to add a methyl substituent in the available ortho-position of the starting phenol. The Mannich reaction will proceed at any or all available ring positions of the starting phenol which are ortho- or para- with respect to the phenolic hydroxy position. In general, the reaction favors an available ortho position unless that position is obstructed, for example, through steric hindrance.

The preparation of phenolic Mannich bases and subsequent reduction as described has been classically employed as a means for introducing a methyl substituent into a phenolic nucleus. Both reactions are well-known in the art. Our present invention primarily concerns the second reaction, viz., reduction of phenolic Mannich bases with hydrogen and, more specifically, concerns the improved results which can be obtained through the use of molybdenum sulfide as catalyst for the reduction.

Many catalysts have been suggested for use in the reduction of phenolic Mannich bases; see U.S. Patent 2,194,215, for example. We have found that at least two deficiencies are exhibited by prior catalysts. A first deficiency is that some catalysts exhibit low catalytic activity and selectivity. That is, the yields of desired reduction products are low. A second difficulty with prior catalysts is the decreased activity resulting from use, frequently accompanied by decrepitation of the catalyst into fine particles which contaminate the ultimate product. We have found that molybdenum sulfide as a catalyst in the phenolic Mannich base reduction exhibits activity and selectivity comparable to the best previously reported catalysts. In addition, molybdenum sulfide catalyst does not decrease in activity from continuing use and does not exhibit decrepitation. The initial implication of our discoveries is that we can produce the desired reduction product from phenolic Mannich bases in high yield and in high recovery, uncontaminated by catalyst fines. A more far reaching implication is that we have discovered a process in which the catalyst may be employed repetitively (either in batchwise or continuous treatment) without serious loss of activity or deterioration. In brief, our present invention has made commercially feasible a process for adding one or more methyl substituents to a starting phenolic nucleus.

Commercial utility of phenolic compounds frequently depends upon the number and ring-position of substituents. Frequently a methylated phenol will possess desirable properties which do not exist in the corresponding non-methylated phenol. The Mannich reaction and subsequent reduction of the resulting Mannich base has provided a convenient technique for synthesizing methylated phenols on a laboratory scale. The present invention makes it possible to methylate phenols on a commercial scale.

The phenolic Mannich bases with which the present invention is concerned will be described by their method of preparation. The starting phenol must have at least one hydrogen-containing ring position which is ortho- or para- to the phenolic hydroxy substituent. Suitable phenols would include phenol itself, cresols, xylenols, as well as any mono-substituted and di-substituted phenol. Tri-substituted and tetra-substituted phenols may be employed provided at least one ortho- or para-ring position contains hydrogen. An example of a tri-substituted phenol which might be used is 2,3,5-trimethyl phenol; one open ortho- and one open para-position exist in this compound. An example of a tri-substituted phenol which is not suitable is mesitol (2,4,6-trimethyl phenol) since only meta-positions are open in this compound. Bicyclic, polycyclic and dihydric phenols meeting these requirements also can be employed as starting material.

The formaldehyde may be employed in any of its commercially available forms such as formalin or para-formaldehyde.

Any strongly basic secondary amine may be employed. Those which are liquid at room temperature may be employed directly, e.g. piperidine, morpholine, hexamethylenimine, pyrrolidine, and the like. Those which are vaporous at room temperature, such as dimethylamine, may be employed by providing a closed pressurized system or by dissolving them in a suitable solvent. Water is a preferred solvent for dimethylamine. Secondary amines which are solid at room temperature, such as piperazine, may be employed if dissolved in a suitable solvent such as alcohol.

Dialkylamines and heterocyclic amines which are strongly basic are suitable.

Since virtually complete recovery of the strongly basic secondary amine is comprehended in the present invention, the relatively high cost of certain amines is not a serious factor in assessing feasibility of the process.

The Mannich base may be prepared at a satisfactory rate without catalyst at room temperature by combining in a reaction vessel one mol of formaldehyde and one mol of strongly basic secondary amine for each Mannich base group which is to be substituted into the phenolic starting material. Preferably a suitable solvent such as methanol or ethanol is added to dissolve the reactants. With ortho-cresol as the starting phenolic material, for example, it is possible to place two Mannich base groups in each phenolic nucleus at the open ortho- and para-positions. With phenols as the starting material, for example, it is possible to place three Mannich base groups into the nucleus at the two open ortho-positions and the one open para-position.

The products from the Mannich reaction are recovered as a solid or liquid phase according to the nature of the specific Mannich base. The products include unreacted starting phenol, unreacted secondary amine, unreacted formaldehyde, water formed by condensation, the solvent and the desired Mannich base.

The Mannich bases may now be converted into higher methyl homologs of the starting phenols by the Mannich base reduction process. Preferably the Mannich bases are dissolved in a solvent such as toluene or benzene. The solution of Mannich bases is introduced into a hydrogenation reaction zone containing molybdenum sulfide catalyst. Molybdenum sulfide catalyst is available in a commercial form in which the active ingredient, molybdenum sulfide, is impregnated on a porous, inert, abrasion-resistant support of a granular or pelleted configuration. Usually the support contains about 20 to about 50 percent by weight of molybdenum sulfide. For batchwise reduction, we prefer that the hydrogenation reaction zone contain about 5 to 20 parts by weight of molybdenum sulfide for each 100 parts by weight of Mannich base.

The catalytic properties of molybdenum sulfide in certain hydrogenation reactions is known. To the best of our knowledge, we are the first persons to employ molybdenum sulfide catalysts for reducing phenolic Mannich bases. In the catalyst art, molybdenum sulfide can be prepared by heating molybdenum oxide together with sulfur. The resulting sulfides of molybdenum are usually impregnated upon inert catalyst supports.

During the reduction process, the hydrogenation reaction vessel is maintained under a pressure of hydrogen gas. A hydrogenation pressure of 100 to 3000 p.s.i. is suitable. We prefer to maintain the hydrogenation pressure from about 200 to 1000 p.s.i. The hydrogenation reaction vessel is maintained at a hydrogenation temperature from about 125 to 225° C. We prefer a hydrogenation temperature of about 180–190° C. Where large amounts of catalyst are employed, lower temperatures may be used. At lower temperatures, however, the phenolic Mannich base has a tendency to undergo pyrolysis in preference to hydrogenation.

The reactants are maintained under the hydrogenation conditions in the hydrogenation reaction vessel for a sufficient period of time to effect substantially complete elimination of secondary amine from the phenolic Mannich base. Completion of reaction is indicated in a batchwise system when the hydrogen pressure ceases to decrease. The desired methylated phenol may be recovered readily by conventional separation techniques.

Figure 2:
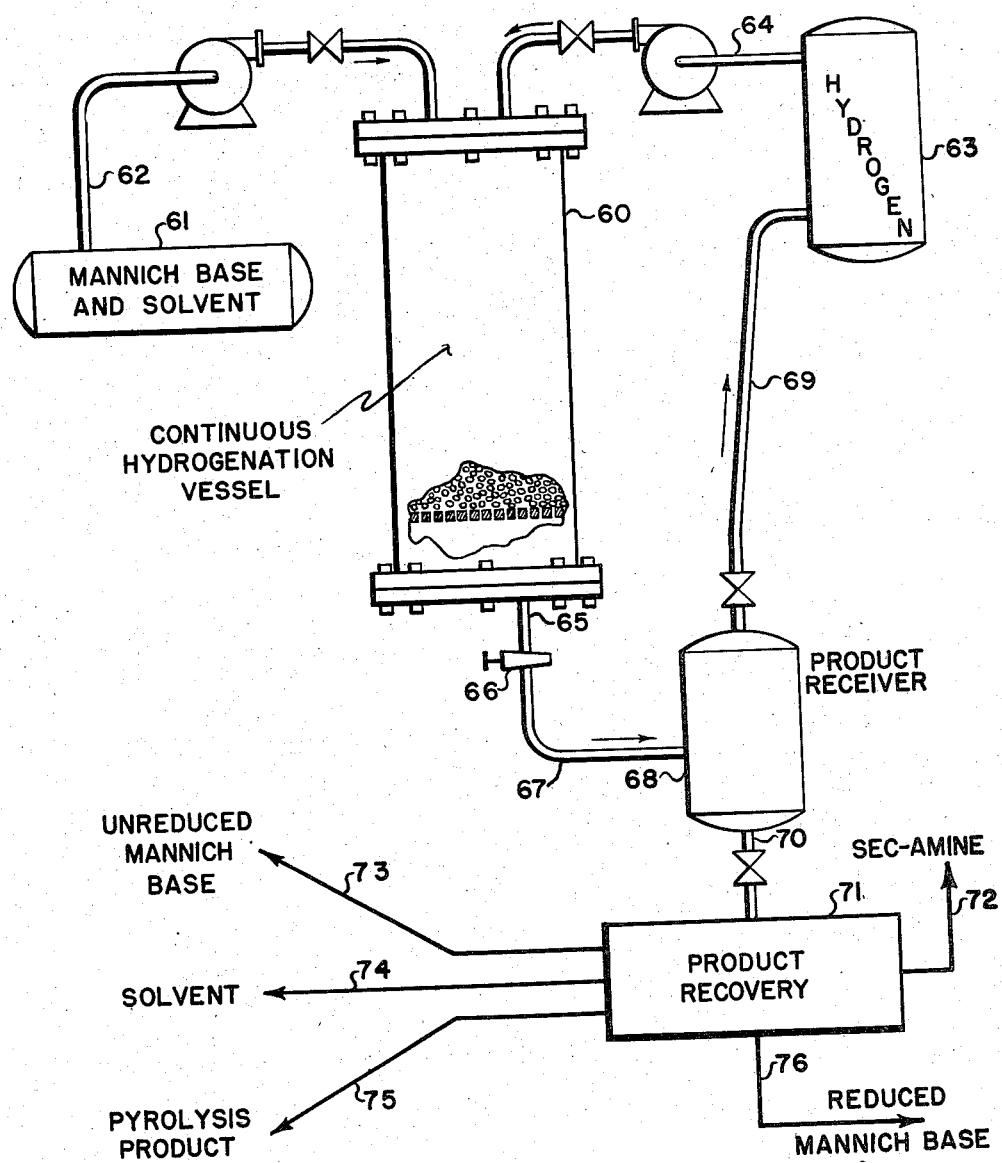

For a clear understanding of the present invention, its objects and advantages, reference should be had to the following detailed description and accompanying drawings in which:

Figure 1 is a schematic flow sheet representation of a batchwise process for adding a methyl substituent to a phenol via the Mannich reaction employing the present invention in the reduction of the Mannich base; and Figure 2 is a schematic flow sheet representation of a continuous hydrogenation process for producing phenolic Mannich bases according to the present invention.

Referring to Figure 1, the starting materials for the present process are confined in storage tanks 10 (phenol storage tank), 11 (strongly basic secondary amine storage tank) and 12 (formaldehyde storage tank). Phenol from the phenol storage tank 10 is introduced through a line 13 into a Mannich reaction vessel 9. Equal mol quantities of secondary amine and formaldehyde are introduced into the Mannich reaction vessel 9 through lines 14 and 15 respectively. Where a bis-Mannich base or a tris-Mannich base is desired from the starting phenol, two or three molar equivalents of secondary amine and formaldehyde are employed respectively. Where the sec-amine is normally gaseous, it may be employed as a solution in a suitable solvent. With sec-amines which are normally solid, suitable solvents may be employed to effect solution. The lower aliphatic alcohols are satisfactory solvents for this purpose. Solvents may be introduced from a solvent tank 16 through a line 17 into the Mannich reaction vessel 9.

No catalyst is required to complete the Mannich reaction which proceeds smoothly at ordinary temperature, e.g., 25 to 50° C. Preferably the reactants are maintained under agitated conditions for a sufficient time, e.g., several hours, to complete the reaction. Thereafter the contents of the Mannich reaction vessel 9 may be withdrawn through a line 18 and may be mixed with water introduced through a line 19. The function of the added water is to promote a phase separation to permit convenient recovery of the aqueous-insoluble Mannich bases. The mixture of Mannich reaction products is introduced into a product recovery zone 20. Where the Mannich base is a solid material, it may be recovered in a highly pure condition by simple filtration. Where the Mannich base is a liquid, it forms an aqueous-insoluble phase separable by decantation. Some unreacted phenol will be present in the nonaqueous phase but does not interfere with the subsequent reduction treatment with which the present invention is primarily concerned. The Mannich base is recovered through a line 21 and is stored in a Mannich base storage vessel 22.

Unreacted starting materials are recovered (as filtrate or as an aqueous phase) from the product recovery zone 20 through a line 23 for further treatment in a recovery zone 24. Individual constituents are thereafter recovered in any convenient manner as by distillation, extraction and the like for recycle in the process. The solvent is returned to the solvent tank 16 through a line 25. Unreacted formaldehyde is returned to the formaldehyde storage vessel 12 through a line 26. Unreacted strongly basic secondary amine is returned to the secondary amine storage vessel 11 through a line 27. Unreacted phenol in some cases is returned to the phenol storage vessel 10 through a line 28. Much of the unreacted phenol remains with the Mannich base throughout the subsequent reduction treatment. The water of condensation and added water may be rejected from the system through a line 29.

As thus far described, the process is a well-known method for preparing Mannich bases. The reduction of the Mannich bases contained in the Mannich base storage vessel 22 in accordance with one embodiment of the present invention will now be described. A quantity of miscible solvent is withdrawn from a solvent storage vessel 30 through a line 31 and blended with the Mannich bases in the Mannich base storage vessel 22. Benzene and toluene are suitable solvents. In some instances the solvent may be added to the Mannich base recovery zone 20 to permit recovery of Mannich bases as an extract of the solvent.

A solution of Mannich bases in solvent is withdrawn from the storage vessel 22 through a line 32 and introduced into a hydrogenation vessel 33 adapted to confine liquid reactants at elevated temperatures and pressures. A quantity of molybdenum sulfide catalyst from a storage vessel 34 is introduced into the hydrogenation vessel 33 through a line 35. The molybdenum sulfide catalyst preferably is comprised of an inert, porous, abrasion-resistant support which has been impregnated with about 20 to 50 percent by weight of molybdenum sulfide. Sufficient catalyst should be used to provide about 5 to 20 parts of molybdenum sulfide by weight for each 100 parts by weight of Mannich base in the hydrogenation vessel 33.

The hydrogenation vessel 33 is sealed and hydrogen is introduced through a conduit 36 to provide a hydrogenation pressure within the vessel 33. Preferably about 200 to 1000 p.s.i. will be employed. The reactants are maintained within the hydrogenation vessel 33 under conditions of intimate liquid-gas contact for sufficient time to effect regeneration of the secondary amine from the Mannich base. In a batch-wise system as shown in Figure 1, completion of the reaction may be detected when the hydrogen pressure ceases to decrease. In general, a residence time of about 1 to 10 hours at a hydrogenation temperature of about 125–225° C. will provide sufficient contact for completion of the reduction reaction. Thereupon excess gases are vented from the hydrogenation vessel 33 through the line 36 and a vent conduit 37. If desired, the hydrogen gas may be recovered for reuse. If the sec-amine used in the process is normally gaseous, some of it may be recovered through the vent conduit 37.

The contents of the hydrogenation vessel 33 are withdrawn through a line 38 and are subjected to a filtration treatment in a filtration zone 39 to recover catalyst particles. The recovered catalyst is recycled through a line 40 to the catalyst storage vessel 34. Since the catalyst is in the physical form of the pelleted or granular support, its recovery should be virtually complete. A liquid filtrate (i. e., the hydrogenate) is recovered from the filtration zone 39 through a line 41 and treated in an acid washing zone 42. An aqueous solution of mineral acid is introduced through a line 43 for recovering the strongly basic secondary amine and unreacted Mannich bases as an aqueous acidic solution which is removed through a line 44. The aqueous acid extract is treated in a springing zone 45 by contact therein with an alkali solution from a line 46 which rejects the secondary amine and unreacted Mannich bases from aqueous solution. The aqueous insoluble phase is recovered following phase separation through a line 47 for separation and reuse in the process. Regenerated sec-amine is returned through a line 48 to the sec-amine storage vessel 11. Unreacted Mannich bases are returned through a line 49 for reintroduction into the process. The Mannich bases may be reintroduced into the Mannich reaction zone 9 or into the Mannich base storage vessel 22. The aqueous phase, formed in the springing zone 45, is rejected through a line 50. This aqueous phase contains ionized salts formed during the springing treatment. If desired the aqueous phase may be recycled back to the Mannich base recovery zone 20 through line 19 and may be rejected from the system through line 29.

Referring back to the acid washing zone 42, the aqueous insoluble phase produced therein is recovered through a line 51 for ultimate product recovery, for example, by conventional distillation in a distillation section 52. As readily separable distillate fractions, one may recover the solvent through a line 53 leading to the solvent storage vessel 30 and the original starting phenols (unreacted in the process or regenerated via pyrolysis reactions) through a line 54 leading to the phenol storage vessel 10. The ultimate product of the present process is recovered from the distillation section 52 through a line 55 as a methyl-substituted starting phenol. Higher boiling side reaction products are rejected as a distillation residue through a line 56.

The outstanding feature of the present process resides in the ability of the catalyst to be re-employed in subsequent reductions of Mannich bases. The catalyst recovered through the line 40 is comparable in activity and selectivity to fresh catalyst. In semi-continuous processing, in fact, we prefer to retain the catalsyt pellets within the hydrogenation vessel 33 at all times, thus avoiding movement of catalyst following each batch treatment. To accomplish this result a filter septum may be provided within the hydrogenation vessel 33 to permit only liquid products to pass therethrough into the conduit 38. The filter septum would retain the catalyst pellets within the hydrogenation vessel 33 where they can be reemployed for treating subsequent batches of Mannich base.

Thus the catalyst may be employed over and over again without replacement or regeneration. We have found that the classical catalysts deteriorate rapidly in a single use. The classical catalysts, moreover, are not amenable to regeneration.

To illustrate the present invention, a number of examples of Mannich base reduction will be described. In each reduction, the Mannich base, dissolved in a suitable solvent, was charged into a 300 ml. rocking hydrogenation bomb along with a catalyst. The bomb was charged with hydrogen to a pressure of 2000 p.s.i. and heated to the indicated temperature. As reaction proceeded, the hydrogen pressure decreased indicating hydrogen absorption. When the pressure reached 200 p.s.i., additional hydrogen was charged into the bomb to restore a pressure of 2000 p.s.i. The reduction treatment was continued in each instance until the hydrogen pressure stopped decreasing, indicating no further hydrogen absorption. The time required varied from about 2 to about 8 hours.

The solvents employed in the tests included benzene, toluene, xylene and 6-t-butyl-2,4-xylenol. We have found that these solvents do not affect the results of the hydrogenation reaction but merely serve to provide a suitable liquid reaction media. The 6-t-butyl-2,4-xylenol was employed as a solvent in those tests where 6-t-butyl-2,4-xylenol was the desired product of the Mannich base reduction, viz., tests 11, 12, 13, 17 and 18.

Where molybdenum sulfide catalyst is specified, the material was a pelleted alumina, impregnated with about 20 percent molybdenum sulfide in some instances and with about 50 percent molybdenum sulfide in other instances. The copper chromite catalyst was simply granular copper chromite. The platinum catalyst was a commercial hydrogenation catalyst comprising alumina pellets impregnated with 0.2 percent by weight of platinum.

Yields throughout are reported as mols of desired product divided by mols of starting Mannich base, multiplied by 100 to express percentage.

EXAMPLE 1

*Preparation of mesitol from 6-(dimethylaminomethyl)-2, 4-xylenol*

A quantity of 6-(dimethylaminomethyl)-2,4-xylenol was prepared by Mannich reaction of 2,4-xylenol, dimethylamine and formaldehyde. The desired product, mesitol, is useful as an antioxidant, for example, in gasoline.

*Test 1.*—6-(dimethylaminomethyl)-2,4-xylenol and 12 percent by weight molybdenum sulfide catalyst were treated at 200–240° C. as described for 2 hours. The yield of mesitol was 85 percent.

*Test 2.*—6-(dimethylaminomethyl)-2,4-xylenol and 10 percent molybdenum sulfide catalyst were treated at 178–182° C. as described for about 6 hours. The yield of mesitol was 82 percent.

*Test 3.*—6-(dimethylaminomethyl)-2,4-xylenol and 15 percent by weight of copper chromite catalyst were treated at 183° C. as described for about 5 hours. The yield of mesitol was 87 percent.

*Test 4.*—6-(dimethylaminomethyl)-2,4-xylenol and 12 percent by weight copper chromite catalyst were treated at 185° C. as described for about 5 hours. The yield of mesitol was 92 percent.

*Test 5.*—6 - (dimethylaminomethyl) - 2,4 - xylenol was mixed with 69 percent by weight of commercial platinum catalyst containing 0.2 percent by weight platinum on alumina. The mixture was treated at 210–250° C. as described for about 5 hours. The yield of mesitol was 41 percent.

Reviewing tests 1 through 5 it is seen that molybdenum sulfide catalyst is equivalent in activity and selectivity to the classical copper chromite catalyst in a single use. The molybdenum sulfide catalyst is clearly superior to the platinum catalyst from the standpoint of yield.

EXAMPLE 2

*Preparation of mesitol from 4,6-bis-(dimethylaminomethyl)-ortho-cresol*

A quantity of 4,6-bis-(dimethylaminomethyl)-ortho-cresol was prepared from ortho-cresol, dimethylamine and formaldehyde.

*Test 6.*—4,6-bis-(dimethylaminomethyl) - ortho - cresol and 10 percent molybdenum sulfide catalyst were treated at 190–210° C. as described for about 8 hours. The yield of mesitol was 67 percent.

*Test 7.*—4,6-bis-(dimethylaminomethyl) - ortho - cresol and 10 percent by weight copper chromite catalyst were treated at 190–210° C. as described for about 8 hours. The yield of mesitol was about 34 percent.

*Test 8.*—4,6-bis-(dimethylaminomethyl) - ortho - cresol was mixed with 10 percent by weight of commercial catalyst comprising alumina impregnated with 0.2 weight percent platinum. The mixture was treated at 190 to 210° C. as described for about 8 hours. The yield of mesitol was 10.2 percent.

Reviewing tests 6 through 8 it is seen that, from the standpoint of yield, molybdenum sulfide is superior to copper chromite and vastly superior to platinum as a catalyst for use with the bis-Mannich base under investigation.

EXAMPLE 3

*Preparation of mesitol from 2,4,6-tris-(dimethylaminomethyl)-phenol*

A quantity of 2,4,6-tris-(dimethylaminomethyl)-phenol was obtained from a commercial chemical supplier.

*Test 9.*—2,4,6-tris-(dimethylaminomethyl)-phenol and 10 percent by weight molybdenum sulfide catalyst were treated at 170–190° C. as described for about 5 hours. The yield of mesitol was 19 percent.

*Test 10.*—2,4,6-tris-(dimethylaminomethyl)-phenol and 10 percent by weight copper chromite catalyst were treated at 170–190° C. as described for about 5 hours. The yield of mesitol was 23 percent.

Reviewing tests 9 and 10 it is seen that, from the standpoint of yield, molybdenum sulfide is comparable to copper chromite as a catalyst for use with the tris-Mannich base under investigation.

EXAMPLE 4

*Preparation of 6-t-butyl-2,4-xylenol from 4-(N-piperidylmethyl)-6-t-butyl-ortho-cresol*

A quantity of 4-(N-piperidylmethyl)-6-t-butyl-ortho-cresol, which is a solid at room temperature, was prepared from 6-t-butyl-ortho-cresol, piperidine and formaldehyde. The desired product, 6-t-butyl-2,4-xylenol, is useful as an antioxidant, for example, in gasoline.

*Test 11.*—4-(N-piperidylmethyl)-6-t-butyl-ortho-cresol and 10 percent by weight molybdenum sulfide catalyst were treated at 170–190° C. as described for about 5 hours. The yield of 6-t-butyl 2,4-xylenol was 69 percent.

*Test 12.*—4-(N-piperidylmethyl)-6-t-butyl-ortho-cresol and 38 percent by weight copper chromite catalyst were treated at 170–190° C. as described for about 5 hours. The yield of 6-t-butyl-2,4-xylenol was 75 percent.

Reviewing tests 11 and 12 it is seen that, from the standpoint of yield, molybdenum sulfide is comparable to copper chromite as a catalyst for use with the Mannich base under investigation.

EXAMPLE 5

*Preparation of 6-t-butyl-2,4-xylene from 4-(dimethylaminomethyl)-6-t-butyl-ortho-cresol*

A quantity of 4-(dimethylaminomethyl-6-t-butyl-ortho-cresol, which is a solid at room temperature, was prepared from 6-t-butyl-ortho-cresol, dimethylamine and formaldehyde.

*Test 13.*—4 - (dimethylaminomethyl) - 6-t-butyl-ortho-cresol and 10 percent by weight of molybdenum sulfide catalyst were treated at 175° C. as described for about 5 hours. The yield of 6-t-butyl-2,4-xylenol was 62 percent.

EXAMPLE 6

*Preparation of durenol from 6-(dimethylaminomethyl)-2,3,5-trimethylphenol*

A quantity of 6 - (dimethylaminomethyl) - 2,3,5 - trimethylphenol, which is a solid at room temperature, was prepared from 2,3,5-trimethylphenol, dimethylamine and formaldehyde. The desired product, durenol, is a high melting phenol.

*Test 14.*—6-(dimethylaminomethyl) - 2,3,5 - trimethylphenol and 10 percent by weight molybdenum sulfide catalyst were treated at 170 to 190° C. as described for about 5 hours. The yield of durenol was 62 percent. Durenol is 2,3,5,6-tetramethyl-phenol.

EXAMPLE 7

*Preparation of durenol from 6-(N-piperidylmethyl)-2,3,5-trimethylphenol*

A quantity of 6-(N-piperidylmethyl)-2,3,5-trimethylphenol, which is a solid at room temperature, was prepared from 2,3,5-trimethylphenol, piperidine and formaldehyde.

*Test 15.*—6-(N-piperidylmethyl)-2,3,5-trimethylphenol and 10 percent by weight molybdenum sulfide catalyst were treated at 170–190° C. as described for about 3 hours. The yield of durenol was 43 percent.

EXAMPLE 8

*Preparation of 2,6-di-t-butyl-para-cresol from 4-(N-piperidylmethyl)-2,6-di-t-butylphenol*

A quantity of 4-(N-piperidylmethyl)-2,6-di-t-butylphenol, which is a solid at room temperature, was prepared from 2,6-di-t-butylphenol, piperidine and formaldehyde. The desired product, 2,6-di-t-butyl-para-cresol, is useful as an antioxidant, for example, in gasoline.

*Test 16.*—4-(N-piperidylmethyl)-2,6-di-t-butylphenol and 10 percent by weight molybdenum sulfide catalyst were treated at 170–190° C. as described for about 5 hours. The yield of 2,6-di-t-butyl-para-cresol was 69 percent.

Reviewing tests 11 through 16, it is seen that molybdenum sulfide is an effective catalyst for use with a variety of phenolic Mannich bases. Acceptable yields of the desired product methylated phenols are demonstrated. It should be remembered that the reported yields are based on a single-pass operation. Recovery of unreduced Mannich bases and of phenols (restored through pyrolysis) will result in increased yields for the overall process.

EXAMPLE 9

*Preparation of 6-t-butyl-2,4-xylenol from 4-(dimethylaminomethyl)-6-t-butyl-ortho-cresol illustrating reuse of catalysts*

A quantity of 4-(dimethylaminomethyl)-6-t-butyl-ortho-cresol was prepared from 6-t-butyl-ortho-cresol, dimethylamine and formaldehyde.

*Test 17.*—A series of four sequential tests was conducted. In each test 75 grams of 4-(dimethylaminomethyl)-6-t-butyl-ortho-cresol was reduced as described at 180° C. for about 5 hours with 10 percent by weight copper chromite catalyst. The copper chromite catalyst recovered from treating a first batch was reemployed without further processing for treating a second batch. The copper chromite catalyst recovered from the second batch was reemployed without further processing for treating a third batch. The copper chromite catalyst recovered from the third batch was reemployed without further processing for treating a fourth batch. The yields of 6-t-butyl-2,4-xylenol from the four tests were:

First batch _____ 71 percent.
Second batch _____ 65 percent.
Third batch _____ Unknown—product destroyed when container broke.
Fourth batch _____ 45 percent.

Analysis of the products from the fourth batch revealed the presence of 42 percent of unreacted Mannich base. Since the reactants ceased to consume hydrogen, it can be assumed that the catalyst had lost its activity completely during treatment of the fourth batch.

*Test 18.*—A series of five sequential tests was conducted. In each test 75 grams of 4-(dimethylaminomethyl)-6-t-butyl-ortho-cresol was reduced as described at 180° C. for about 5 hours with 10 percent by weight of molybdenum sulfide catalyst (7.5 grams of molybdenum sulfide). The catalyst recovered from the first test was employed without further processing in the second test . . . and so forth . . . until five tests have been carried out in succession with the same catalyst. The yields of 6-t-butyl-2,4-xylenol from the five batches were:

|  | Percent |
|---|---|
| First batch | 70 |
| Second batch | 71 |
| Third batch | 69 |
| Fourth batch | 64 |
| Fifth batch | 71.5 |

Example 9 is illustrative of the improved recycle property which we have discovered in molybdenum sulfide as a catalyst for phenolic Mannich base reductions. In five successive treatments the molybdenum sulfide catalyst did not decrease in activity or selectivity within the precision of the experiments. On the other hand, the classical copper chromite catalyst decreased seriously in activity in the course of four batch treatments. It is, moreover, interesting to note that examination of the hydrogenation bomb following reductions with copper chromite catalyst reveals a deposition of metallic copper film on the inner surfaces of the bomb indicating severe deterioration of the catalyst.

Thus we have demonstrated that reductions of phenolic Mannich bases according to the present invention permit reuse of the molybdenum sulfide catalyst, thereby significantly increasing the feasibility of commercial use of the Mannich base technique for introducing methyl substituents into phenolic nuclei.

An even further implication of our present discovery is the resulting feasibility of a continuous processing technique for reducing phenolic Mannich bases. Such a process is illustrated schematically in Figure 2 which will now be described.

Referring to Figure 2, a continuous hydrogenation reaction vessel 60 is provided for carrying out the reduction process. The continuous hydrogenation vessel 60 is adapted to confine a bed of molybdenum sulfide catalyst at the desired hydrogenation conditions. These may include hydrogen pressures up to 3000 p.s.i. and temperatures up to about 225° C. A feed tank 61 contains the starting phenolic Mannich base and a suitable solvent such as toluene or benzene. The solution of phenolic Mannich base is withdrawn from the feed tank 61 through a line 62 and introduced into the continuous hydrogenation vessel 60 at the selected operating pressure. A hydrogen tank 63 is provided for supplying hydrogen through a line 64 under suitable pressures to maintain the selected hydrogenation reaction pressure within the continuous hydrogenation vessel 60.

The liquid phase solution of Mannich base passes through the catalyst bed within the continuous hydrogenation vessel 60 in intimate contact with hydrogen under elevated pressures and undergoes therein the desired reduction to form a methyl phenol corresponding to the Mannich base and a regenerated strongly basic secondary amine. The liquid hourly space velocity (a measure of residence time) of the Mannich base is selected to assure substantially complete reduction. A solution of reduced Mannich base and secondary amine is continuously withdrawn from the continuous hydrogenation vessel 60 through the line 65 and a pressure let-down valve 66 and recovered at substantially atmospheric pressure through a line 67. The solution passes into a product receiver vessel 68 which separates liquid (i.e., the hydrogenate) from vaporous ingredients. Any entrained hydrogen may be returned through a line 69 to the hydrogen tank 63 for reuse. The liquid phase products, solvent and recycle ingredients, pass through a line 70 to a product recovery zone 71. Appropriate separating techniques similar to those described in connection with Figure 1 may be employed to permit independent recovery of the strongly basic secondary amine through a line 72; unreduced Mannich base through a line 73; solvent through a line 74; pyrolysis products (e.g., the starting phenol) through a line 75; and the desired reduced Mannich base (which will be the methyl phenol corresponding to the starting Mannich base) through a line 76.

GENERAL DISCUSSION

Mesitol-starting phenols for the preparation of mesitol include 6-(sec-aminomethyl)-2,4-xylenol, such as shown in Example 1; 4-(sec-aminomethyl)-2,6-xylenol; 2,6-(bis-sec-aminomethyl)-p-cresol; 4,6 - (bis-sec-aminomethyl)-ortho-cresol, such as shown in Example 2; and 2,4,6-(tris-sec-aminomethyl)phenol, such as shown in Example 3.

Durenol-starting materials for the preparation of durenol include 6-(sec-aminomethyl)-2,3,5-trimethylphenol as shown in Examples 6 and 7; and 2,6-(bis-sec-aminomethyl)-3,5-xylenol.

6-t-butyl-2,4-xylenol can be prepared from 2,4-(bis-sec-aminomethyl)-6-t-butyl-phenol; from 4-(sec-aminomethyl)-6-t-butyl-ortho-cresol, as shown in Examples 4, 5 and 9; and from 2-(sec-aminomethyl)-6-t-butyl-para-cresol.

2,6-di-t-butyl-para-cresol can be prepared from 4-(sec-aminomethyl)-2,6-di-t-butyl-phenol.

According to the provisions of the patent statutes, we have explained the principle, preferred construction, and mode of operation of our invention and have illustrated and described what we now consider to represent its best embodiment. However, we desire to have it understood that, within the scope of the appended claims, the invention may be practiced otherwise than as specifically illustrated and described.

We claim:

1. The method for reducing a phenolic Mannich base to yield a methylated phenol and a sec-amine which comprises contacting said phenolic Mannich base in a liquid phase with hydrogen gas in the presence of molybdenum sulfide catalyst under hydrogenation pressures and temperatures, thereafter recovering a hydrogenate free of said catalyst, separately recovering said catalyst for reuse, and recovering sec-amine and methylated phenol from said hydrogenate.

2. The method for reducing a phenolic Mannich base to yield a methylated phenol and a sec-amine which comprises contacting said phenolic Mannich base in a liquid phase with hydrogen gas in the presence of molybdenum sulfide catalyst at a hydrogenation pressure of 100 to 3000 p.s.i.g. and a hydrogenation temperature of 125 to 225° C., thereafter recovering a hydrogenate free of said catalyst, separately recovering said catalyst for reuse, and recovering sec-amine and methylated phenol from said hydrogenate.

3. The method for reducing a phenolic Mannich base to yield a methylated phenol and a sec-amine which comprises contacting said phenolic Mannich base in a liquid phase with hydrogen gas in the presence of 0.05 to 0.20 part by weight (based on Mannich base) of molybdenum sulfide catalyst at a hydrogenation pressure of 100 to 3000 p.s.i.g. and a hydrogenation temperature of 125 to to 225° C., thereafter recovering a hydrogenate free of said catalyst, separately recovering said catalyst for reuse, and recovering sec-amine and methylated phenol from said hydrogenate.

4. The method for reducing a phenolic Mannich base to yield a methylated phenol and a sec-amine which comprises contacting said phenolic Mannich base in a liquid phase with hydrogen gas in the presence of a catalyst comprising a particulate, porous inert solid support containing 20 to 50 percent by weight of molybdenum sulfide at a hydrogenation pressure of 100 to 3000 p.s.i.g. and a hydrogenation temperature of 125 to 225° C., thereafter recovering a hydrogenate free of said catalyst, separately recovering said catalyst for reuse and recovering sec-amine and methylated phenol from said hydrogenate.

5. The method for reducing a phenolic Mannich base to yield a methylated phenol and a sec-amine which comprises introducing said phenolic Mannich base in a liquid phase into a hydrogenation zone containing catalyst comprising a particulate, porous, inert solid support containing 20 to 50 percent by weight of molybdenum sulfide, contacting said phenolic Mannich base and said catalyst in said hydrogenation zone with hydrogen gas at a hydrogenation pressure of 100 to 3000 p.s.i.g. and a hydrogenation temperature of 125 to 225° C., thereafter recovering a hydrogenate from said hydrogenation zone separately from said catalyst, and recovering sec-amine and methylated phenol from said hydrogenate.

6. A semi-continuous process for preparing a methylated phenol and a sec-amine from a phenolic Mannich base which comprises contacting a batch of said phenolic Mannich base in a liquid phase with hydrogen gas in the presence of a batch of catalyst comprising a particulate, porous, inert solid support containing 20 to 50 percent by weight of molybdenum sulfide at a hydrogenation pressure of 100 to 3000 p.s.i.g. and a hydrogenation temperature of 125 to 225° C., thereafter recovering a hydrogenate free of said catalyst, recovering sec-amine and methylated phenol from said hydrogenate and repeating the entire process by employing the said batch of catalyst.

7. A continuous process for preparing a methylated phenol and a sec-amine from a phenolic Mannich base which comprises continuously introducing phenolic Mannich base in liquid phase into a hydrogenation zone containing a bed of particulate, porous, inert solid support containing 20 to 50 percent by weight of molybdenum sulfide, maintaining a partial pressure of hydrogen within said hydrogenation zone at a level of 100 to 3000 p.s.i.g., maintaining the temperature of said hydrogenation zone from 125 to 225° C., and continuously recovering a hydrogenate from said hydrogenation zone, free of catalyst and recovering from said hydrogenate sec-amine and methylated phenol.

8. The method for preparing mesitol and dimethylamine from phenolic Mannich bases selected from the class consisting of 6-(dimethylaminomethyl)-2,4-xylenol, 4,6-bis-(dimethylaminomethyl)-ortho-cresol and 2,4,6-tris-(dimethylaminomethyl)-phenol which comprises contacting said phenolic Mannich bases in liquid phase with hydrogen gas in the presence of molybdenum sulfide catalyst at a hydrogenation pressure of 100 to 3000 p.s.i.g. and a hydrogenation temperature of 125 to 225° C., recovering separately from said catalyst a hydrogenate and recovering mesitol and dimethylamine from said hydrogenate.

9. The method for preparing 6-t-butyl-2,4-xylenol from phenolic Mannich bases selected from the class consisting of 4-(N-piperidylmethyl)-6-t-butyl-ortho-cresol and 4 - (dimethylaminomethyl)-6-t-butyl-ortho-cresol which comprises contacting said phenolic Mannich bases in liquid phase with hydrogen gas in the presence of molybdenum sulfide catalyst at a hydrogenation pressure of 100 to 3000 p.s.i.g. and a hydrogenation temperature of 125 to 225° C., recovering separately from said catalyst a hydrogenate and recovering 6-t-butyl-2,4-xylenol from said hydrogenate.

10. The method for preparing durenol from phenolic Mannich bases selected from the class consisting of 6-(dimethylaminomethyl)-2,3,5-trimethylphenol and 6-(N-piperidylmethyl)-2,3,5-trimethylphenol which comprises contacting said phenolic Mannich bases in liquid phase with hydrogen gas in the presence of molybdenum sulfide catalyst at a hydrogenation pressure of 100 to 3000 p.s.i.g. and a hydrogenation temperature of 125 to 225° C., recovering separately from said catalyst a hydrogenate and recovering durenol from said hydrogenate.

11. The method for preparing 2,6-di-t-butyl-para-cresol from a phenolic Mannich base comprising 4-(N-piperidylmethyl)-2,6-di-t-butylphenol which method comprises contacting said phenolic Mannich base in liquid phase with hydrogen gas in the presence of molybdenum sulfide catalyst at a pressure of 100 to 3000 p.s.i.g. and a hydrogenation temperature of 125 to 225° C., recovering separately from said catalyst a hydrogenate and recovering 2,6-di-t-butyl-para-cresol from said hydrogenate.

12. The method for preparing mesitol from a phenolic Mannich base selected from the class consisting of 2,4,6-(tris-sec-aminomethyl)phenol, 2,4-(bis-sec-aminomethyl)-o-cresol, 2,6-(bis-sec-aminomethyl)-p-cresol, 6-(sec-aminomethyl)-2,4-xylenol and 4-(sec-aminomethyl)-2,6-xylenol which comprises contacting said phenolic Mannich base in liquid phase with hydrogen gas in the presence of molybdenum sulfide catalyst at a hydrogenation pressure of 100 to 3000 p.s.i.g. and a hydrogenation temperature of 125 to 225° C., recovering separately from said catalyst a hydrogenate and recovering mesitol and sec-amine from said hydrogenate.

13. The method for preparing 6-t-butyl-2,4-xylenol from a phenolic Mannich base selected from the class consisting of 2,4-(bis-sec-aminomethyl)-6-t-butyl-phenol, 4-(sec-aminomethyl)-6-t-butyl-o-cresol and 2-(sec-aminomethyl)-6-t-butyl-p-cresol which comprises contacting said phenolic Mannich base in liquid phase with hydrogen gas in the presence of molybdenum sulfide catalyst at a hydrogenation pressure of 100 to 3000 p.s.i.g. and a hydrogenation temperature of 125 to 225° C., recovering separately from said catalyst a hydrogenate and recovering 6-t-butyl-2,4-xylenol and sec-amine from said hydrogenate.

14. The method for preparing durenol from a phenolic Mannich base selected from the class consisting of 6-(sec-aminomethyl)-2,3,5-trimethylphenol and 2,6-(bis-sec-aminomethyl)-3,5-xylenol, which method comprises contacting said phenolic Mannich base in liquid phase with hydrogen gas in the presence of molybdenum sulfide catalyst at a hydrogenation pressure of 100 to 3000 p.s.i.g. and a hydrogenation temperature of 125 to 225° C., recovering separately from said catalyst a hydrogenate and recovering durenol and sec-amine from said hydrogenate.

15. The method for preparing 2,6-di-t-butyl-p-cresol from a phenolic Mannich base comprising 4-(sec-aminomethyl)-2,6-di-t-butyl phenol which comprises contacting said phenolic Mannich base in liquid phase with hydrogen gas in the presence of molybdenum sulfide catalyst at a hydrogenation pressure of 100 to 3000 p.s.i.g. and a hydrogenation temperature of 125 to 225° C., recovering separately from said catalyst a hydrogenate and recovering 2,6-di-t-butyl-p-cresol and sec-amine from said hydrogenate.

References Cited in the file of this patent
UNITED STATES PATENTS

| | | |
|---|---|---|
| 2,194,215 | Bruson et al. | Mar. 19, 1940 |
| 2,289,716 | Marschner | July 14, 1942 |
| 2,398,687 | Winans | Apr. 16, 1946 |

OTHER REFERENCES

Blicke: "Organic Reactions," vol. 1, pages 311, 323 (2 pages), pub. by John Wiley and Sons, New York (1942).

UNITED STATES PATENT OFFICE
CERTIFICATE OF CORRECTION

April 14, 1959

Patent No. 2,882,319

Eric B. Hotelling et al.

It is hereby certified that error appears in the printed specification of the above numbered patent requiring correction and that the said Letters Patent should read as corrected below.

Column 7, line 71, Example 5, in the heading, for "6-t-butyl-2,4-xylene", in italics, read -- 6-t-butyl-2,4-xylenol -- in italics; line 74, for "4-(dimethylaminomethyl-6-t-butyl-ortho-" read -- 4-(dimethylaminomethyl)-6-t-butyl-ortho- --.

Signed and sealed this 29th day of September 1959.

(SEAL)
Attest:

KARL H. AXLINE

Attesting Officer

ROBERT C. WATSON
Commissioner of Patents